United States Patent
Huang et al.

(10) Patent No.: US 10,096,990 B2
(45) Date of Patent: Oct. 9, 2018

(54) SURGE VOLTAGE PROTECTION APPARATUS

(71) Applicant: Chicony Power Technology Co., Ltd., New Taipei (TW)

(72) Inventors: Wen-Nan Huang, New Taipei (TW); Ching-Guo Chen, New Taipei (TW); Shiu-Hui Lee, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 303 days.

(21) Appl. No.: 14/994,629

(22) Filed: Jan. 13, 2016

(65) Prior Publication Data
US 2017/0201088 A1    Jul. 13, 2017

(51) Int. Cl.
*H02H 3/20* (2006.01)
*H02H 3/02* (2006.01)
*H02H 3/04* (2006.01)

(52) U.S. Cl.
CPC .............. *H02H 3/20* (2013.01); *H02H 3/025* (2013.01); *H02H 3/044* (2013.01)

(58) Field of Classification Search
CPC .......... H02H 3/20; H02H 3/044; H02H 3/025; H01F 27/343; H03K 3/53; H01S 5/06825; H02P 29/02; H01R 13/7135
See application file for complete search history.

(56) References Cited

U.S. PATENT DOCUMENTS

| | | | | |
|---|---|---|---|---|
| 6,178,077 B1* | 1/2001 | Kaluza | ..................... | H02H 3/08 361/100 |
| 2010/0073964 A1* | 3/2010 | Tatsukawa | .............. | H02M 1/44 363/15 |
| 2012/0071215 A1* | 3/2012 | Bourque | ................. | G06F 1/266 455/573 |
| 2012/0194955 A1* | 8/2012 | Billingsley | ...... | G01R 19/16547 361/91.1 |
| 2015/0091465 A1* | 4/2015 | Kato | ................. | H02M 3/33507 315/205 |

* cited by examiner

*Primary Examiner* — Cuong B Nguyen
(74) *Attorney, Agent, or Firm* — Muncy, Geissler, Olds & Lowe, P.C.

(57) ABSTRACT

A surge voltage protection apparatus includes a surge voltage absorbing component, a ground component, an electrical status sensing circuit and a control unit. The surge voltage absorbing component receives a surge voltage, so that the electrical status sensing circuit senses an electrical status between the surge voltage absorbing component and the ground component to obtain an electrical data. The electrical status sensing circuit sends the electrical data to the control unit. After the control unit receives the electrical data, the control unit determines the electrical data. When the electrical data is greater than an electrical data predetermined value, the control unit informs a power supply apparatus that the electrical data is greater than the electrical data predetermined value, so that the power supply apparatus is turned off to protect the power supply apparatus.

10 Claims, 2 Drawing Sheets

SURGE VOLTAGE PROTECTION APPARATUS

BACKGROUND OF THE INVENTION

Field of the Invention

The present invention relates to a protection apparatus, and especially relates to a surge voltage protection apparatus.

Description of the Related Art

The surge voltage protection mechanism can protect the power supply, so that the surge voltage protection mechanism is very important. However, the related art surge voltage protection mechanism at least comprises following disadvantages:

1. The accuracy of the related art surge voltage protection mechanism is very low, so that the power supply cannot be protected effectively.

2. For the manufacturer of the power supply, because the testing for the related art surge voltage protection mechanism always needs the manpower, the testing time for the related art surge voltage protection mechanism is very long, so that the manufacturing cost is increased.

3. The related art surge voltage protection mechanism cannot be designed better easily.

SUMMARY OF THE INVENTION

In order to solve the above-mentioned problems, an object of the present invention is to provide a surge voltage protection apparatus.

In order to achieve the object of the present invention mentioned above, the surge voltage protection apparatus includes a surge voltage absorbing component, a ground component, an electrical status sensing circuit and a control unit. The surge voltage absorbing component is electrically connected to a voltage input side of a power supply apparatus. The ground component is electrically connected to the surge voltage absorbing component. The electrical status sensing circuit is electrically connected to the surge voltage absorbing component and the ground component. The control unit is electrically connected to the electrical status sensing circuit and the power supply apparatus. The surge voltage absorbing component receives a surge voltage, so that the electrical status sensing circuit senses an electrical status between the surge voltage absorbing component and the ground component to obtain an electrical data. The electrical status sensing circuit sends the electrical data to the control unit. After the control unit receives the electrical data, the control unit determines the electrical data. When the electrical data is greater than an electrical data predetermined value, the control unit informs the power supply apparatus that the electrical data is greater than the electrical data predetermined value, so that the power supply apparatus is turned off to protect the power supply apparatus.

The present invention at least comprises following advantages:

1. The accuracy of the surge voltage protection mechanism is increased, so that the power supply can be protected effectively.

2. Because the testing for the surge voltage protection mechanism is automated, the testing time for the surge voltage protection mechanism is shorten, so that the manpower and the manufacturing cost are reduced.

3. The testing data can be outputted for analyzing to help design better surge voltage protection mechanism.

DETAILED DESCRIPTION OF THE INVENTION

Please refer to following detailed description and figures for the technical content of the present invention. The following detailed description and figures are referred for the present invention, but the present invention is not limited to it.

Figure 1:
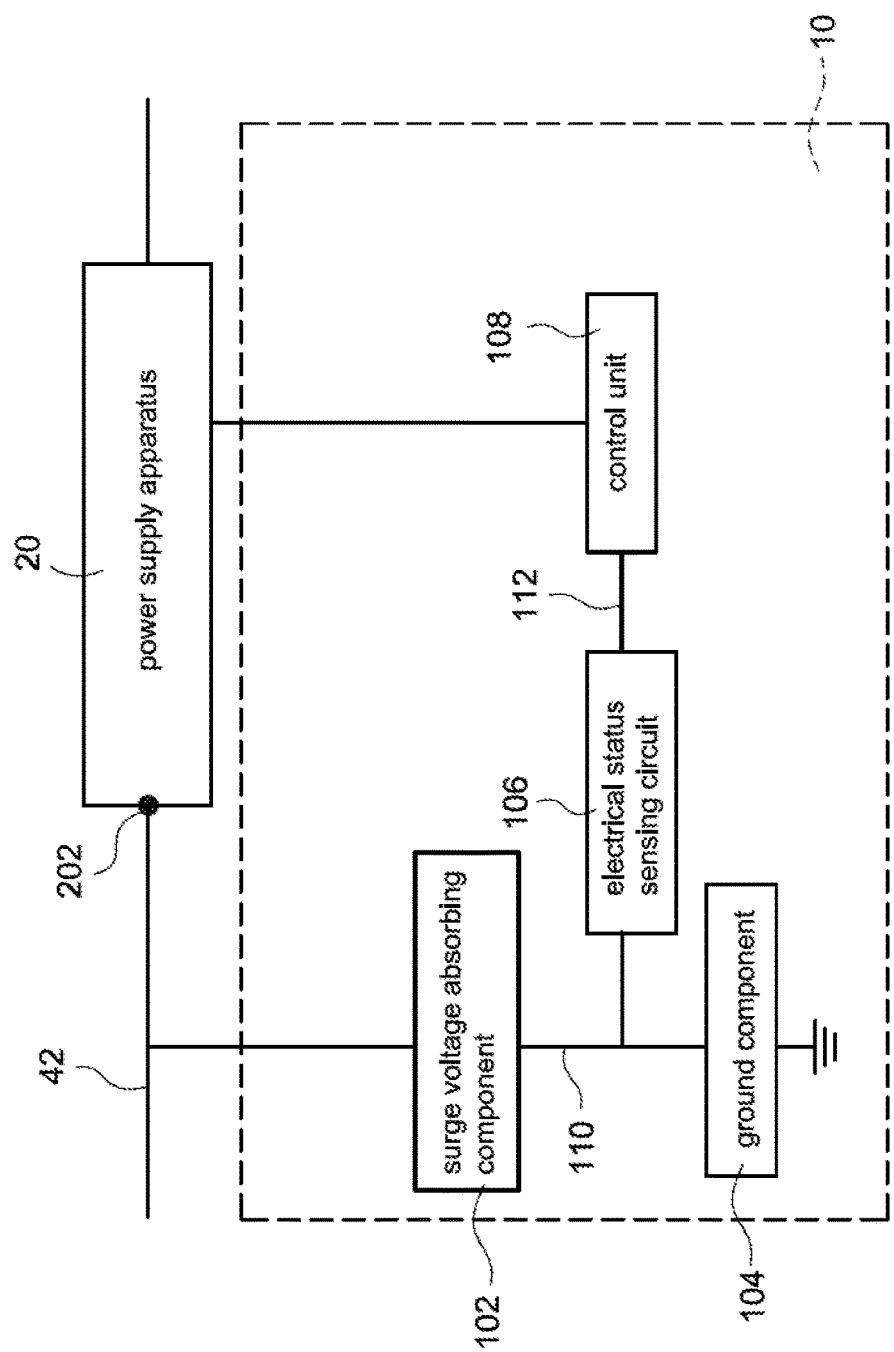
FIG. 1 shows a block diagram of the first embodiment of the surge voltage protection apparatus of the present invention.

FIG. 1 shows a block diagram of the first embodiment of the surge voltage protection apparatus of the present invention. A surge voltage protection apparatus 10 of the present invention includes a surge voltage absorbing component 102, a ground component 104, an electrical status sensing circuit 106 and a control unit 108.

The surge voltage absorbing component 102 is electrically connected to a voltage input side 202 of a power supply apparatus 20. The ground component 104 is electrically connected to the surge voltage absorbing component 102. The electrical status sensing circuit 106 is electrically connected to the surge voltage absorbing component 102 and the ground component 104. The control unit 108 is electrically connected to the electrical status sensing circuit 106 and the power supply apparatus 20.

The surge voltage absorbing component 102 receives a surge voltage 42, so that the electrical status sensing circuit 106 senses an electrical status 110 between the surge voltage absorbing component 102 and the ground component 104 to obtain an electrical data 112. The electrical status sensing circuit 106 sends the electrical data 112 to the control unit 108. After the control unit 108 receives the electrical data 112, the control unit 108 determines the electrical data 112.

When the electrical data 112 is greater than an electrical data predetermined value (namely, the electrical data 112 is too high, so that a surge voltage protection mechanism of the power supply apparatus 20 has to be started to protect the power supply apparatus 20), the control unit 108 informs the power supply apparatus 20 that the electrical data 112 is greater than the electrical data predetermined value, so that the power supply apparatus 20 is turned off (for examples, the power supply apparatus 20 stops working, or inner components of the power supply apparatus 20 stop receiving or processing power) to protect the power supply apparatus 20. Therefore, an accuracy of the surge voltage protection mechanism is increased, so that the power supply apparatus 20 is protected effectively. Moreover, the electrical data predetermined value can be adjusted.

The surge voltage absorbing component 102 is, for example but not limited to, a varistor. The ground component 104 is, for example but not limited to, a resistor, a capacitor or an inductor. The electrical status sensing circuit 106 is, for example but not limited to, a comparator circuit, a current detection circuit, a voltage detection circuit or a power detection circuit. The control unit 108 is, for example but not limited to, a microcontroller or a microprocessor.

The electrical status 110 is, for example but not limited to, a current status, a voltage status or a power status.

Figure 2:
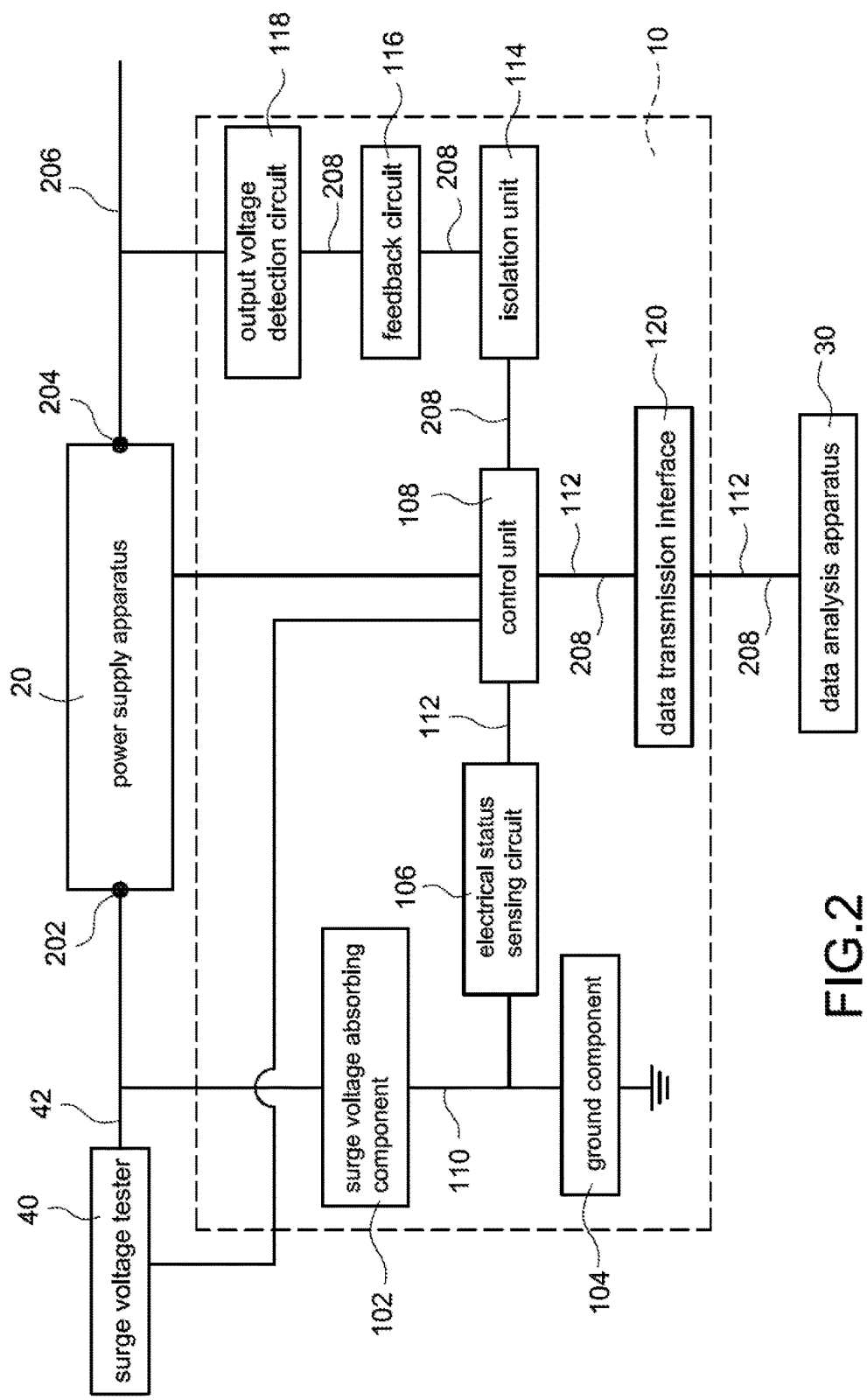
FIG. 2 shows a block diagram of the second embodiment of the surge voltage protection apparatus of the present invention.

FIG. 2 shows a block diagram of the second embodiment of the surge voltage protection apparatus of the present invention. A surge voltage protection apparatus 10 of the present invention includes a surge voltage absorbing component 102, a ground component 104, an electrical status sensing circuit 106, a control unit 108, an isolation unit 114, a feedback circuit 116, an output voltage detection circuit 118 and a data transmission interface 120.

The surge voltage absorbing component 102 is electrically connected to a voltage input side 202 of a power supply apparatus 20. The ground component 104 is electrically connected to the surge voltage absorbing component 102. The electrical status sensing circuit 106 is electrically connected to the surge voltage absorbing component 102 and the ground component 104. The control unit 108 is electrically connected to the electrical status sensing circuit 106 and the power supply apparatus 20. The isolation unit 114 is electrically connected to the control unit 108. The feedback circuit 116 is electrically connected to the isolation unit 114. The output voltage detection circuit 118 is electrically connected to the feedback circuit 116 and a voltage output side 204 of the power supply apparatus 20. The data transmission interface 120 is electrically connected to the control unit 108 and a data analysis apparatus 30.

The output voltage detection circuit 118 detects an output voltage 206 of the voltage output side 204 of the power supply apparatus 20 to obtain an output voltage data 208. After the output voltage detection circuit 118 obtains the output voltage data 208, the output voltage detection circuit 118 sends the output voltage data 208 through the feedback circuit 116 and the isolation unit 114 to the control unit 108. After the control unit 108 receives the output voltage data 208, the control unit 108 determines the output voltage data 208. When the output voltage data 208 is in a standard output voltage range, the control unit 108 determines that the power supply apparatus 20 is in a normal working status. When the output voltage data 208 is not in the standard output voltage range, the control unit 108 determines that the power supply apparatus 20 is in an abnormal status.

Firstly, the surge voltage absorbing component 102 receives a surge voltage 42 generated by a surge voltage tester 40, so that the electrical status sensing circuit 106 senses an electrical status 110 between the surge voltage absorbing component 102 and the ground component 104 to obtain an electrical data 112. The electrical status sensing circuit 106 sends the electrical data 112 to the control unit 108. After the control unit 108 receives the electrical data 112, the control unit 108 determines the electrical data 112.

When the electrical data 112 is not greater than an electrical data predetermined value (namely, the electrical data 112 is not too high, so that a surge voltage protection mechanism of the power supply apparatus 20 does not need to be started) and the control unit 108 determines that the power supply apparatus 20 is in the normal working status, the control unit 108 informs the surge voltage tester 40 that the electrical data 112 is not greater than the electrical data predetermined value and the control unit 108 determines that the power supply apparatus 20 is in the normal working status, so that the surge voltage tester 40 generates the surge voltage 42 at a higher intensity. Moreover, the electrical data predetermined value can be adjusted. This situation means that the surge voltage protection mechanism needs to be tested continuously.

When the electrical data 112 is not greater than the electrical data predetermined value (namely, the electrical data 112 is not too high, so that the surge voltage protection mechanism of the power supply apparatus 20 does not need to be started) but the control unit 108 determines that the power supply apparatus 20 is in the abnormal status, the control unit 108 informs the surge voltage tester 40 that the power supply apparatus 20 is in the abnormal working status, so that the surge voltage tester 40 stops generating the surge voltage 42. This situation means that the electrical data predetermined value needs to be adjusted (usually needs to be decreased).

When the electrical data 112 is greater than the electrical data predetermined value (namely, the electrical data 112 is too high, so that the surge voltage protection mechanism of the power supply apparatus 20 has to be started to protect the power supply apparatus 20), the control unit 108 informs the power supply apparatus 20 that the electrical data 112 is greater than the electrical data predetermined value, so that the power supply apparatus 20 is turned off (for examples, the power supply apparatus 20 stops working, or inner components of the power supply apparatus 20 stop receiving or processing power) to protect the power supply apparatus 20, and the control unit 108 informs the surge voltage tester 40 that the electrical data 112 is greater than the electrical data predetermined value, so that the surge voltage tester 40 stops generating the surge voltage 42. In order to design better surge voltage protection mechanism, the electrical data predetermined value can be increased to test by the surge voltage 42 at the higher intensity to determine whether the power supply apparatus 20 is in the normal working status or in the abnormal status.

Finally, the control unit 108 automatically records the electrical data 112, the output voltage data 208, the electrical data predetermined value, the standard output voltage range, a status of the power supply apparatus 20 (in the normal working status or in the abnormal status), a voltage value of the surge voltage 42 and a voltage duration of the surge voltage 42 etc. every time. Then, the control unit 108 sends the information mentioned above through the data transmission interface 120 to the data analysis apparatus 30 to analyze to improve the design of the surge voltage protection mechanism. Therefore, the present invention can automatically test the surge voltage protection mechanism of the power supply apparatus 20 to reduce the testing time, and the design of the surge voltage protection mechanism is improved.

The surge voltage absorbing component 102 is, for example but not limited to, a varistor. The ground component 104 is, for example but not limited to, a resistor, a capacitor or an inductor. The electrical status sensing circuit 106 is, for example but not limited to, a comparator circuit, a current detection circuit, a voltage detection circuit or a power detection circuit. The control unit 108 is, for example but not limited to, a microcontroller or a microprocessor. The electrical status 110 is, for example but not limited to, a current status, a voltage status or a power status. The isolation unit 114 is, for example but not limited to, a photo coupler. The data transmission interface 120 is, for example but not limited to, a universal serial bus or a general purpose interface bus.

The present invention at least comprises following advantages:

1. The accuracy of the surge voltage protection mechanism is increased, so that the power supply can be protected effectively.

2. Because the testing for the surge voltage protection mechanism is automated, the testing time for the surge voltage protection mechanism is shorten, so that the manpower and the manufacturing cost are reduced.

3. The testing data can be outputted for analyzing to help design better surge voltage protection mechanism.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A surge voltage protection apparatus comprising:
   a surge voltage absorbing component electrically connected to a voltage input side of a power supply apparatus;
   a ground component electrically connected to the surge voltage absorbing component;
   an electrical status sensing circuit electrically connected to the surge voltage absorbing component and the ground component; and
   a control unit electrically connected to the electrical status sensing circuit and the power supply apparatus,
   wherein the surge voltage absorbing component receives a surge voltage, so that the electrical status sensing circuit senses an electrical status between the surge voltage absorbing component and the ground component to obtain an electrical data; the electrical status sensing circuit sends the electrical data to the control unit; after the control unit receives the electrical data, the control unit determines the electrical data; when the electrical data is greater than an electrical data predetermined value, the control unit informs the power supply apparatus that the electrical data is greater than the electrical data predetermined value, so that the power supply apparatus is turned off to protect the power supply apparatus.

2. The surge voltage protection apparatus in claim 1 further comprising:
   an isolation unit electrically connected to the control unit.

3. The surge voltage protection apparatus in claim 2 further comprising:
   a feedback circuit electrically connected to the isolation unit.

4. The surge voltage protection apparatus in claim 3 further comprising:
   an output voltage detection circuit electrically connected to the feedback circuit and a voltage output side of the power supply apparatus,
   wherein the output voltage detection circuit detects an output voltage of the voltage output side of the power supply apparatus to obtain an output voltage data; after the output voltage detection circuit obtains the output voltage data, the output voltage detection circuit sends the output voltage data through the feedback circuit and the isolation unit to the control unit; after the control unit receives the output voltage data, the control unit determines the output voltage data; when the output voltage data is in a standard output voltage range, the control unit determines that the power supply apparatus is in a normal working status; when the output voltage data is not in the standard output voltage range, the control unit determines that the power supply apparatus is in an abnormal status.

5. The surge voltage protection apparatus in claim 4, wherein when the electrical data is not greater than the electrical data predetermined value and the control unit determines that the power supply apparatus is in the normal working status, the control unit informs a surge voltage tester that the electrical data is not greater than the electrical data predetermined value and the control unit determines that the power supply apparatus is in the normal working status, so that the surge voltage tester generates the surge voltage at a higher intensity.

6. The surge voltage protection apparatus in claim 4, wherein when the electrical data is not greater than the electrical data predetermined value but the control unit determines that the power supply apparatus is in the abnormal status, the control unit informs a surge voltage tester that the power supply apparatus is in the abnormal status, so that the surge voltage tester stops generating the surge voltage.

7. The surge voltage protection apparatus in claim 4, wherein when the electrical data is greater than the electrical data predetermined value, the control unit informs a surge voltage tester that the electrical data is greater than the electrical data predetermined value, so that the surge voltage tester stops generating the surge voltage.

8. The surge voltage protection apparatus in claim 4 further comprising:
   a data transmission interface electrically connected to the control unit and a data analysis apparatus,
   wherein the control unit sends the electrical data and the output voltage data through the data transmission interface to the data analysis apparatus.

9. The surge voltage protection apparatus in claim 1, wherein the surge voltage absorbing component is a varistor; the ground component is a resistor, a capacitor or an inductor; the electrical status sensing circuit is a comparator circuit, a current detection circuit, a voltage detection circuit or a power detection circuit; the control unit is a microcontroller or a microprocessor; the electrical status is a current status, a voltage status or a power status.

10. The surge voltage protection apparatus in claim 8, wherein the isolation unit is a photo coupler; the data transmission interface is a universal serial bus or a general purpose interface bus.

* * * * *